Sept. 16, 1969 C. VAN DER LELY 3,466,818
PREFABRICATED BUILDINGS
Filed June 16, 1966 10 Sheets-Sheet 2
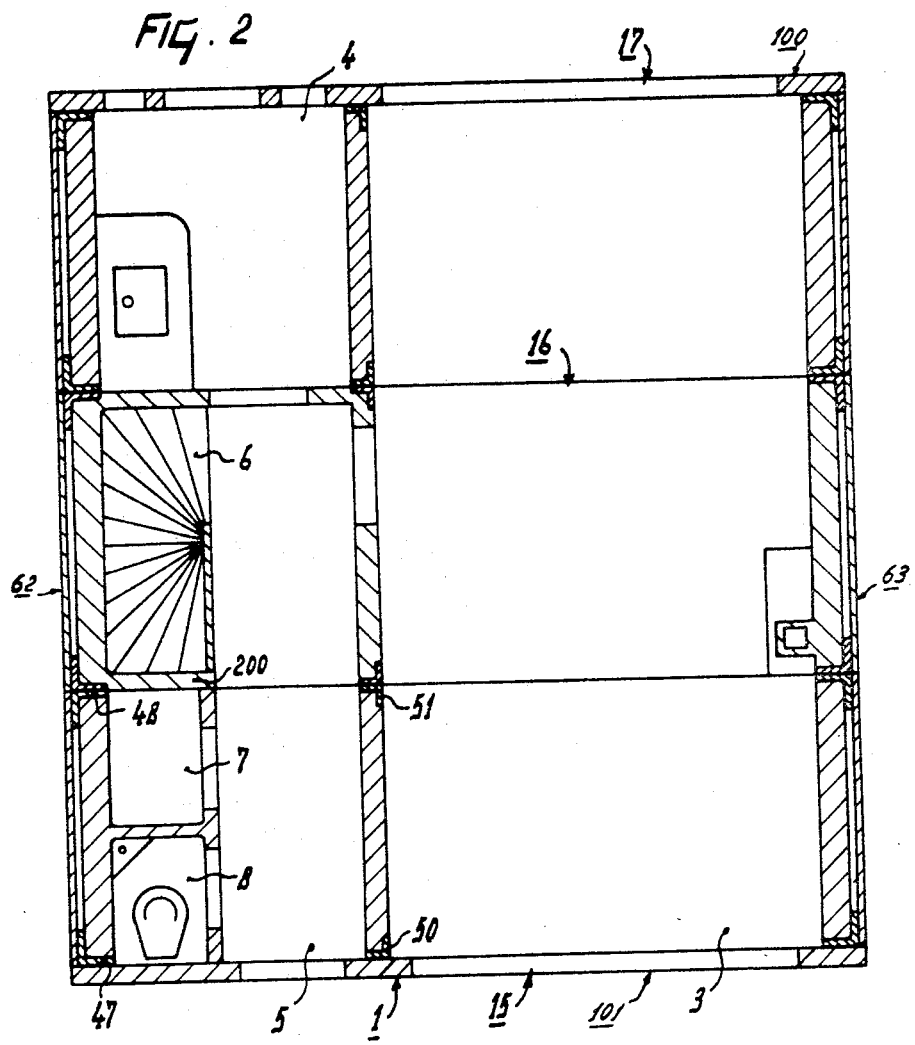
INVENTOR
CORNELIS VAN DER LELY
BY
Mason, Mason & Albright
Attorneys

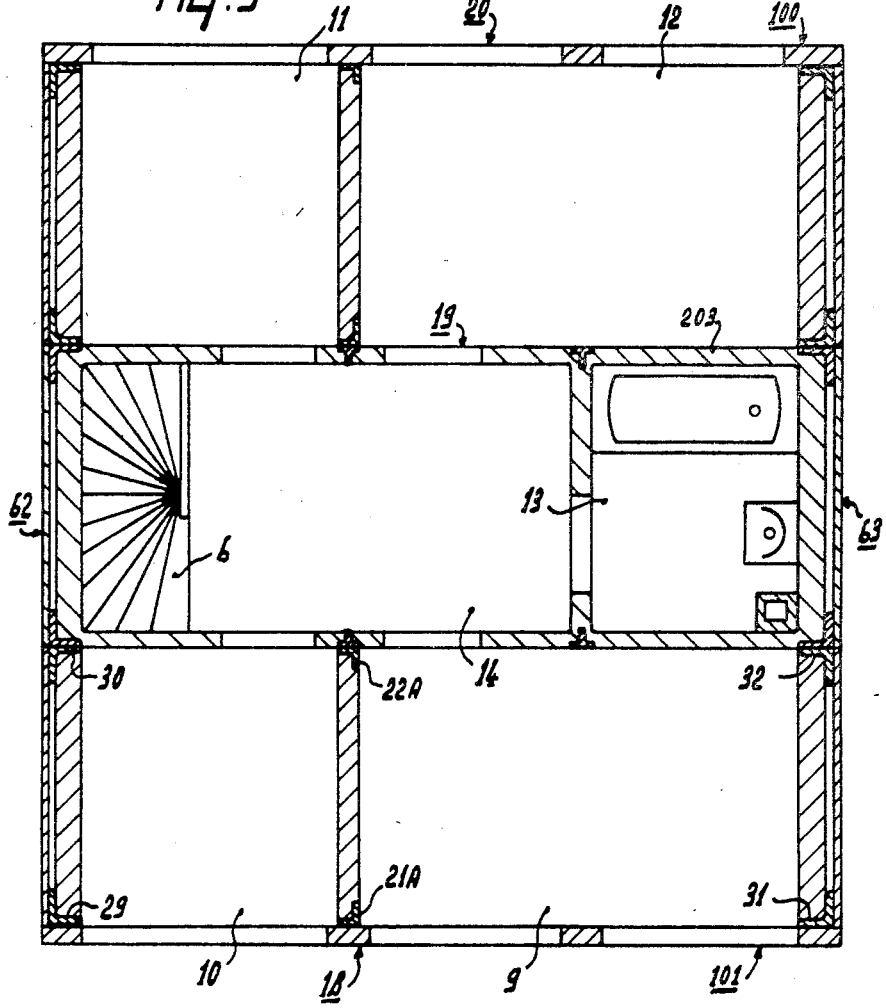

Sept. 16, 1969     C. VAN DER LELY     3,466,818
PREFABRICATED BUILDINGS
Filed June 16, 1966     10 Sheets-Sheet 4
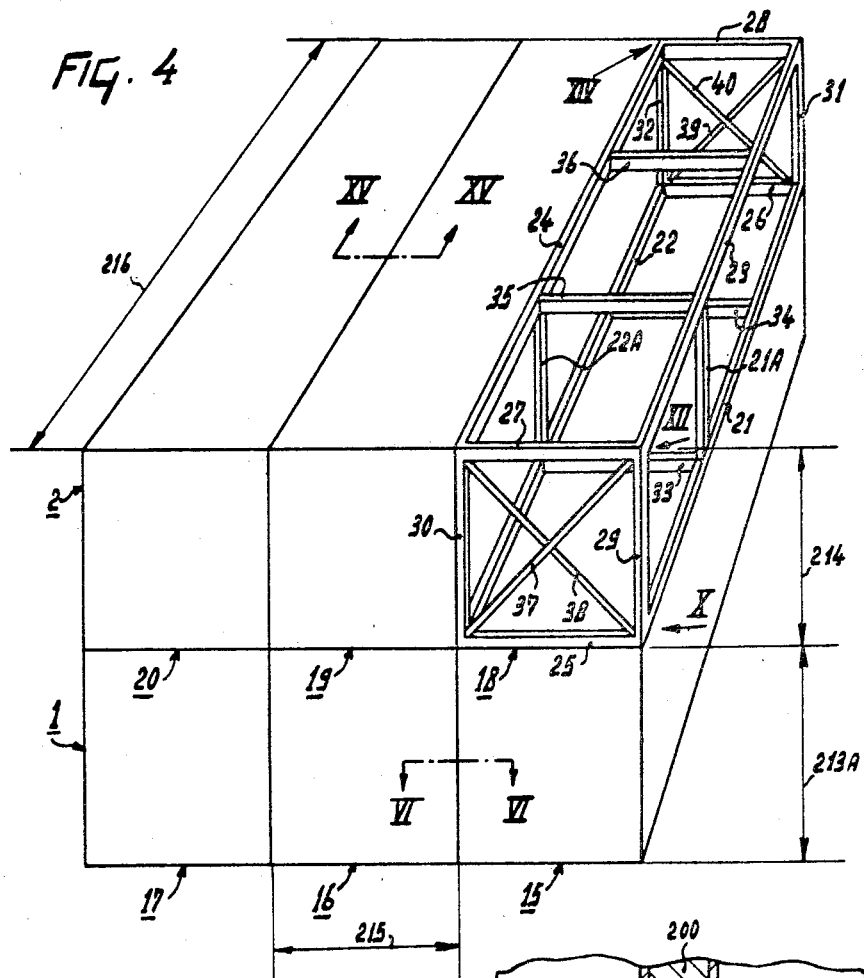
INVENTOR
CORNELIS VAN DER LELY
BY
Mason, Mason & Albright
Attorneys

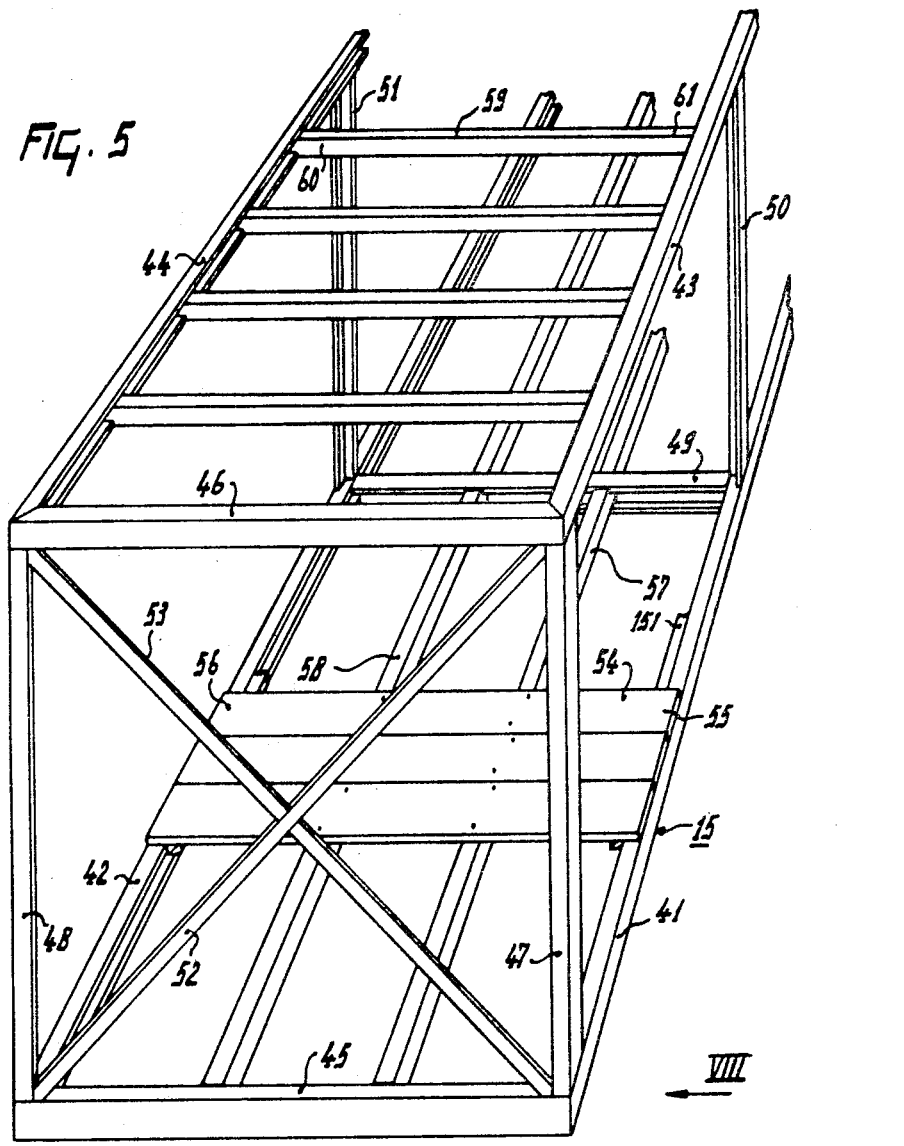

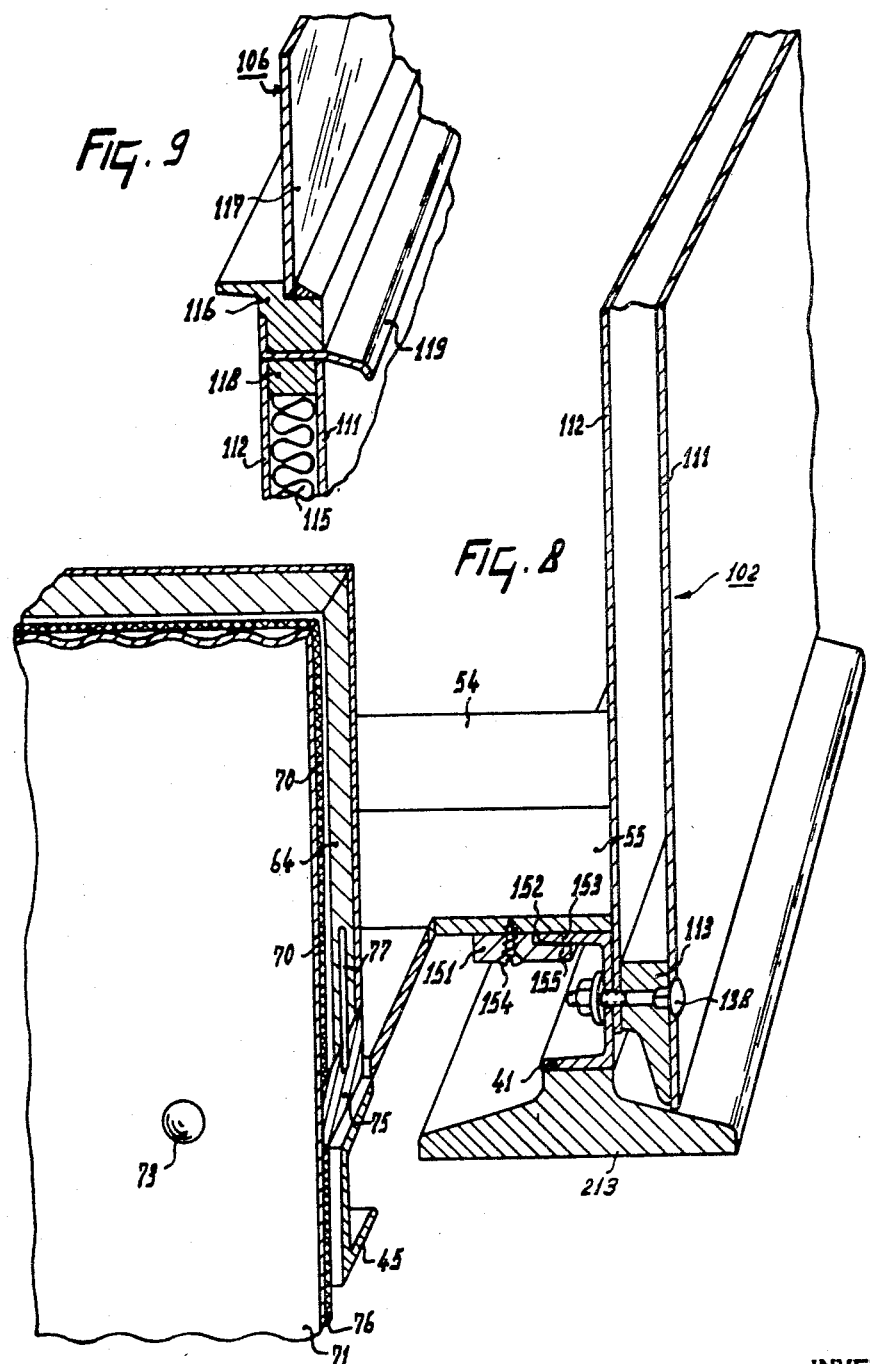

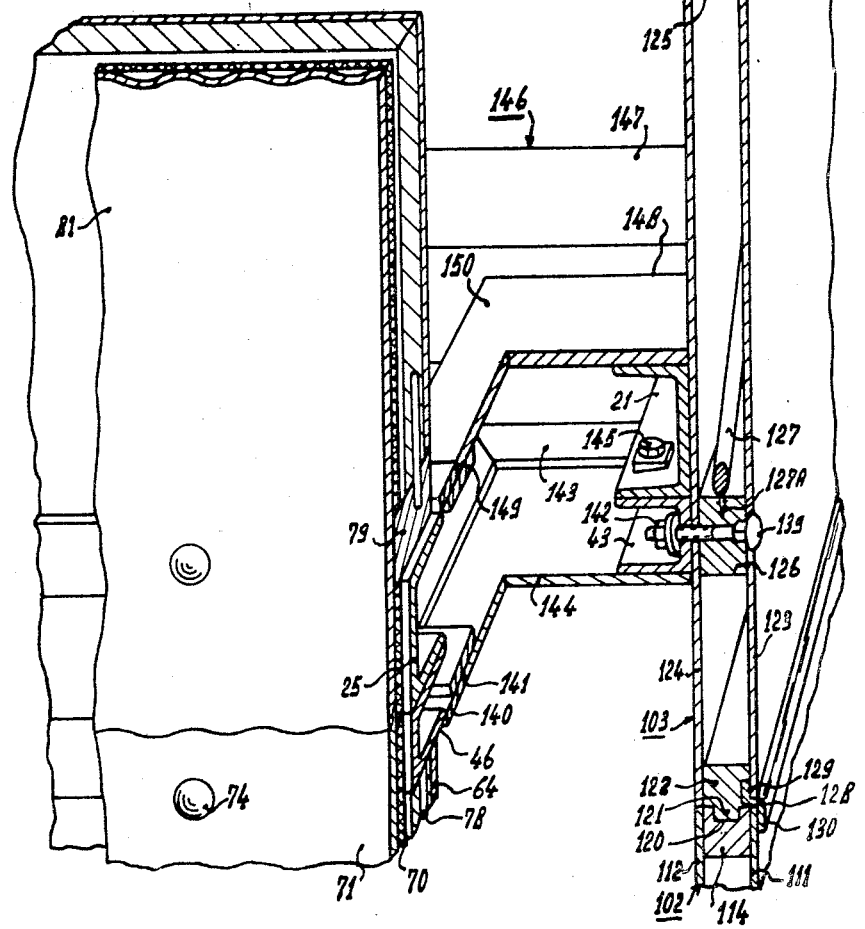

Sept. 16, 1969  C. VAN DER LELY  3,466,818
PREFABRICATED BUILDINGS
Filed June 16, 1966  10 Sheets-Sheet 8

INVENTOR
CORNELIS VAN DER LELY
BY
Mason, Mason & Albright
Attorneys

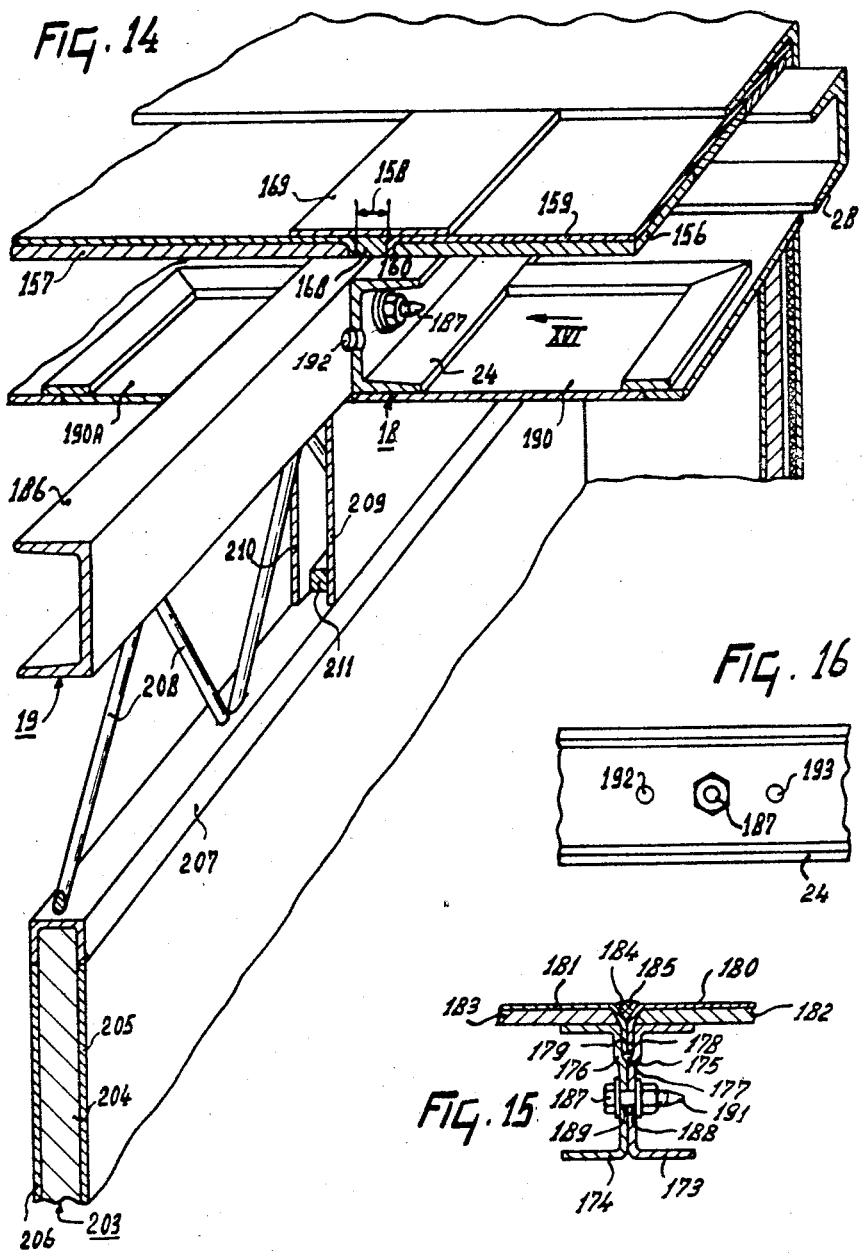

United States Patent Office 3,466,818
Patented Sept. 16, 1969

3,466,818
PREFABRICATED BUILDINGS
Cornelis van der Lely, Bruschenrain 7,
Zug, Switzerland
Continuation-in-part of application Ser. No. 142,592,
Oct. 3, 1961. This application June 16, 1966, Ser.
No. 558,029
Int. Cl. E04h 1/02; E04d 3/38; E04b 1/74
U.S. Cl. 52—79                           10 Claims

ABSTRACT OF THE DISCLOSURE

The disclosure is directed to the sealing of the roof between adjacent prefabricated elements by providing a channel between adjacent roof elements, lining the channel with a fibrous material, filling the lined channel and impregnating the fibrous material therein with an adhesive filling material, and applying a waterproof material over the filling material.

A concrete wall in a prefabricated element with a framework of metal beams, the wall adjoining the whole thickness of the adjacent beams, a layer of insulating material on the outside of the building extending over the wall and adjoining beams, and a covering layer over the insulating layer.

A fastening arrangement for adjacent prefabricated elements having a framework of metal beams comprising horizontal bolts connecting adjacent beams of the elements, a ceiling being disposed under and a floor above the bolts, there being a removable ceiling portion for access to the bolts.

A building of adjacent elongated prefabricated elements, the longer sides of the elements being open with walls on the shorter ends, prefabricated panels placed on the longer sides of the element for the exterior of the building.

Cross references to related applications

This is a continuation-in-part of my application Serial No. 142,592, filed October 3, 1961 and now Patent No. 3,256,652. The invention relates to a building, and more particularly to various elements of a building.

Summary and objects of the invention

A primary object of the invention is to provide a building with cooperating structure whereby it can be constructed quickly and simply. In accordance with the invention this is achieved by constructing the building from a number of box-shaped elements, each of which comprises at least part of the dwelling space and has a frame of beams, the elements being provided with vertical sides or walls, at least some of which are made from heavier material than the material of a horizontal side or sides comprising the ceiling or the floor, or both.

A further aspect of the invention relates to a building which is constructed from a number of box-shaped, prefabricated elements, each of which comprises at least part of the building's dwelling space and includes a frame of beams; the walls of the elements being arranged in major part between the beams of the frame.

Another aspect of the invention relates to a building comprising at least two floors constructed from a number of box-shaped, prefabricated elements; each of which comprises at least part of the building's dwelling space and includes a frame of beams which provides (with minimal or no assistance from other structural members) the supporting structure of the building.

Other objects, adaptabilities and capabilities will appear as the description progresses, reference being had to the accompanying drawings, in which:

Brief description of the drawings

FIGURE 2 is a plan view of the ground floor of the house shown in FIG. 1;

FIGURE 3 is a further plan view of the top floor of the house shown in FIGS. 1 and 2;

FIGURE 4 shows diagrammatically the six elements of the house with, however, only the frame of one element being shown;

FIGURE 5 shows on an enlarged scale part of the frame of the foremost element of the lower elements of the house shown in FIGS. 1 to 4;

FIGURE 6 shows on an enlarged scale a sectional view of the corners of two adjacent elements, taken on the line VI—VI in FIGURE 4;

FIGURE 7 is an elevation of the detail shown in FIG. 6, taken on the line VII—VII;

FIGURE 8 shows on an enlarged scale a corner of the house, indicated in FIG. 5 by the arrow VIII, in which corner are shown part of the front façade and of the side façade;

FIGURE 9 shows on an enlarged scale a sectional view of a detail of the front façade of the building, taken on the line IX—IX in FIG. 1;

FIGURE 10 shows the adjacent corners of two elements arranged one above the other, indicated in FIG. 4 by the arrow X;

FIGURE 11 is a sectional view of engaging edges of the covering plates of the side façades of two elements lying one above the other;

FIGURE 14 shows the top corners of the two adjacent elements, indicated in FIG. 4 by the arrow XIV;

FIGURE 15 is a sectional view of the top edges of two elements, lying one against the other and the top sides of which constitute the roof of the building, the view being taken on the line XV—XV in FIG. 4;

FIGURE 16 is an elevation of the fastening means of two adjacent elements, viewed in the direction of the arrow XVI—XVI in FIG. 14.

Description of the preferred embodiments

Figure 1:
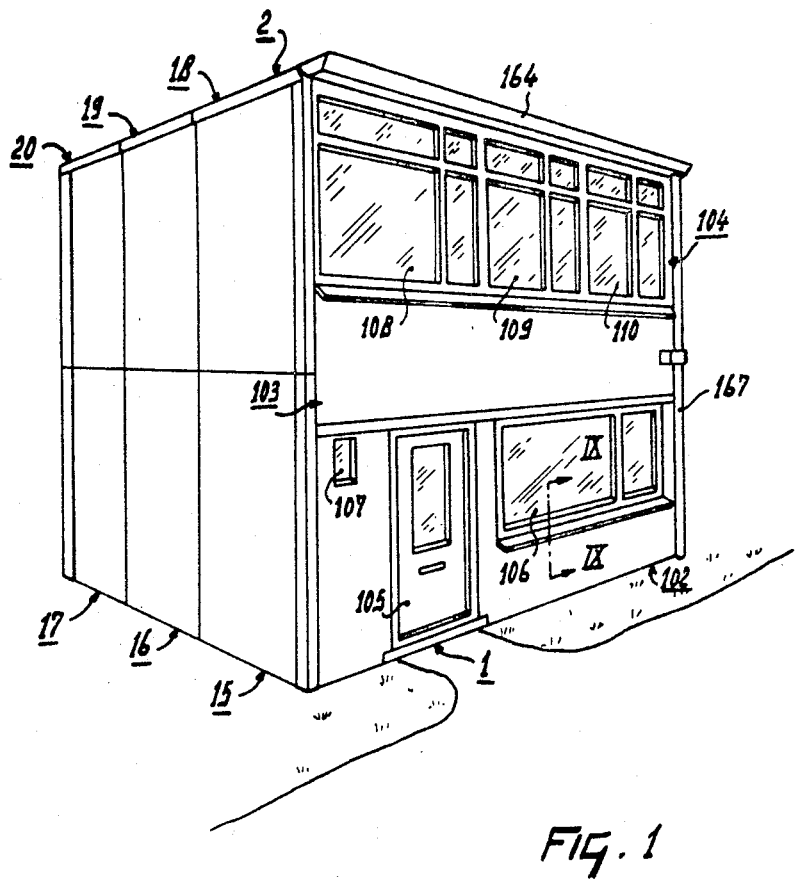
FIGURE 1 is a perspective view of a side façade and a front façade of a building in accordance with the invention, forming a house.

The figures show a building forming a house, which is shown in a perspective view in FIG. 1. The house comprises two floors 1 and 2, each of which comprises a few rooms or spaces. The floor 1 (FIG. 2) comprises a living room 3, a kitchen 4, a hall 5, a cupboard 7 and a toilet 8. A staircase 6 communicates with the hall 5 and leads to the floor 2 (see FIG. 3). The top floor 2 comprises four bedrooms 9, 10, 11 and 12 and a bathroom 13. The top floor has a corridor 14 in the center, which can be reached from the staircase 6 and leads to the various rooms on this floor 2.

The whole house consists of six elements (FIGS. 1 and 4), whereby the ground floor comprises three elements 15, 16 and 17 and the top floor comprises three elements 18, 19 and 20 (see FIG. 4).

Each of the elements 15 to 20, as is shown in FIG. 4 for the element 18 comprises a frame of beams, to which the walls for the building are fastened. The element 18 comprises four hoirzontal beams 21, 22, 23 and 24, extending in the longitudinal direction of the element. The beams 21 and 22 constitute the lowermost longitudinal beams and the beams 23 and 24 constitute the topmost longitudinal beams of the element. The lowermost beams 21 and 22 are connected with each other at their ends by transverse beams 25 and 26, respectively. The beams 23 and 24 are connected with each other at their ends by transverse beams 27 and 28. The lower beam 21 and the top beam 23 are connected with each other by a vertical beam 29 at one end of the element and at the other end by vertical beam 31. In the same manner the horizontal beams 22 and 24 are connected at opposite ends by vertical beams 30 and 32. The beams 21 and 22 are furthermore connected with each other by two intermediate beams 33 and 34, which are horizontal and orthogonal to the beams 21 and 22, respectively, while the beams 23 and 24 are similarly connected with each other by two horizontal intermediate beams 35 and 36. The beams 21 to 32 of the element define a parallelepiped or a box.

The element is reinforced at one end by struts 37 and 38, which extend between the opposite corners of the rectangle formed by the beams 25, 27, 29 and 30. At the other end the element is reinforced by struts 39 and 40, which extend between the opposite corners of the rectangle formed by the beams 26, 28, 31 and 32. The longitudinal beams 21 and 23, lying one above the other, are furthermore linked to each other by a vertical intermediate beam 21A, while the longitudinal beams 22 and 24, lying one above the other, are furthermore connected with each other by a vertical intermediate beam 22A.

The beams 21A and 22A distribute load between beams 21 and 23, and between beams 22 and 24, and serve also as fulcrums for stresses applied to such beams whereby a load on one side of a beam is countered to some degree by stresses generated thereby on the opposite side of the beam. It will be noted, however, that truss members such as provided by struts 37 and 38 are not included in the longer sides of the element. The number of vertical intermediate beams between the longitudinal beams of an element and their disposition are preferably such that they may additionally serve for supporting walls in the building to form the separation between rooms and spaces in the building. Consequently, it will be appreciated that an element may comprise a greater or smaller number of vertical intermediate beams than is shown in the embodiment. Moreover, the number of horizontal intermediate beams for the various elements may be greater or smaller in accordance with the position of the element and the function of the walls associated herewith.

FIGURE 5 shows part of the element 15 on an enlarged scale, in which the longitudinal beams 41 and 42 of the element, like the longitudinal beams 43 and 44 of this element are formed by metal U-shaped beams. Also the horizontal transverse beams between the ends of the longitudinal beams 41, 42, 43 and 44, of which only the transverse beams 45 and 46 are shown, are formed by metal U-shaped beams. The four vertical angular beams of the element, of which only the beams 47 and 48 are shown, are formed by metal beams having an angular profile. The horizontal intermediate beams, for example the intermediate beam 49, are preferably formed by metal I-shaped beams. The vertical intermediate beams, for example the vertical intermediate beams 50 and 51 of FIG. 5, may be formed, in accordance with the associated walls, by metal angular profiles or metal T-profiles. If these intermediate beams are linked to two aligned walls, these beams preferably have a T-profile (FIGS. 2 and 3). If only one wall or two walls arranged at an angle to each other are associated with such beams, as is the case with the element 15 for the beams 50 and 51, these beams are preferably formed by angular profiles. The struts at the ends of the element, for example the struts 52 and 53 of the element 15, may be made from strip material.

The beams of the element constitute the supporting structure for the element and hence the supporting elements for at least part of the building. These beams are, to this end, shaped in a form such that they are capable of withstanding the forces exerted thereon. The lowermost beams of an element will usually support the vertical sides or walls and the lower side or floor. With the house in the embodiment shown, the floors are formed from adjacent boards, which may be arranged in the elements as is shown in FIG. 5. From this figure it is evident that the part of the floor comprised in FIG. 5 consists of adjacent boards 54, the ends 55 and 56 of which bear on the beams 41 and 42. The boards 54 are supported between their ends 55 and 56 by girders 57 and 58, extending parallel to the longitudinal beams 41 and 42, the ends of these girders being arranged between the flanges of the beams 45 and 49. The girders 57 and 58 are preferably made of timber, so that the boards 54 can be nailed on said girders.

The topmost longitudinal beams 43 and 44 of the element 15 are not required to support such a heavy weight as the beams 41 and 42, since the longitudinal beams 21 and 22 of the element 18, arranged above the element 15, are capable of supporting the weight of and absorbing forces exerted on the parts lying above the beams 43 and 44. The sectional area of the beams 43 and 44 may therefore be smaller than that of the beams 41 and 42. To the bottom sides of the beams 43 and 44 will be secured only the ceiling, to which end wooden transverse girders 59 are arranged between the beams 43 and 44, the ends 60 and 61 of these girders being arranged between the flanges of the U-shaped beams 43 and 44. The lower sides of the transverse girders 59 are coplanar to the lower sides of the beams 43 and 44.

The topmost longitudinal beams of the element 18, which are required to bear the roof, will preferably have the same sectional area as the lower beams 21 and 22 of the element. The sectional area of the beams 21 and 22 is equal to that of the beams 41 and 42 of the element 15. Between the longitudinal beams 23 and 24 are arranged stronger metal intermediate beams 35 and 36 having an I-profile, in order to support the roof and between these I-shaped beams 35 and 36 and the transverse beams 27 and 28 provision may be made of longitudinal girders, e.g. in the same way as the girders 57 and 58 in the element 15.

The vertical side façades 62 and 63 (FIGS. 2 and 3) of the house are formed by walls arranged in the elements 15 to 20 during the prefabrication process. The side façades 62 and 63 consist each of six vertical side or wall portions.

Each wall portion for the side façade of the house is arranged at the ends of an element between the rectangular frame formed by the beams of the element. As is shown for the wall portions of the elements 15 and 18 (FIGS. 6 and 8), a wall portion consists of a wall 64, which is formed by masonry or concrete, which may be a brick-like material, foam concrete or the like. The wall 64 is secured in the element 15 to the vertical angular beams 48 and 47 by means of cramp-irons, welded to the beam 47 and to the limb 65 (FIG. 6) of the beam 48 (not shown), these cramp-irons being at right angles to the limb 65 and extending in the wall 64. The wall 64 is provided on the inner side of an element with a layer 66, which constitutes the inner wall face of a room or a further space of the building. The outer side 67 of the wall 64 is preferably coplanar to the inner side 68 (FIG. 6) of the limb 69 of the beam 48. To the outer side of the limb 69 of the beam 48 and the wall 64 is applied a sheet of insulating material 70, which is supported between the beams of the element from the wall 64. This sheet of insulating material is preferably arranged so that it covers the outer sides of the beams of the element. Particularly, when the beams of the element are made from metal, it is advantageous to cover the beams on the outer side, so that via these beams, which have a good thermal conductivity, no or little heat exchange may take place. The sheets 70 may for example be made from fiber or glass wool. The insulating sheets 70 are covered by covering plates 71, which are waterproof and are preferably made from weather-resistant material. The plates 71 may, for example, be made from wood, polyester or plastic material. The plates 71 of this embodiment are corrugated, but they may also be smooth. The ornamental layer 66 may be formed by plaster applied to the wall 64, finished further on the inner side by a layer 72 of wall paper, wall paint or the like, in accordance with the kind of space in which the layer 66 constitutes the boundary surface.

The sheet of insulating material 70 may be secured in different ways to the beams and the wall 64. For example, the sheet 70 may be stuck to or screwed to the beams 48 and 47. The covering plate 71 is preferably screwed to the element by means of bolts 73 and 74 (FIGS. 8 and 10). For the connection of the bolts 73 and 74 to the element, as is shown in FIG. 8, wooden beams may be provided on the frame beams of the element. In the lower part of the element 15, for example, the beam 45 is provided with a wooden girder 75, which projects slightly beyond the metal beam 45 and the insulating sheet 70 joins the top side of this beam 75 and is coplanar on the outer side with the outer side of the beam 75. Below the beam 75 provision is made of a strip of insulating material 76, which is applied to the outer side of the beam 45. The plate 71 thus bears on the outer side of the beam 75 and the bolt 73 is screwed into the beam 75.

As an alternative, as is shown for the top side of the plate 71, the plate 71 may be secured to the element by means of a bolt 74, which is secured in the metal beam 46 (FIG. 10).

The fastening of the wooden beam 75 to the beam 45 may be carried out in various ways. For example, the beams 75 may be readily connected with flanges of the beam 45 by means of bolts. For connecting the wall 64 with the wooden beam 75, the latter are provided with cramp-irons 77 (FIG. 8), which are provided at their free ends with bent-over ends (not shown). The beam 46 (FIGS. 5 and 10) may be provided in the same manner on the bottom side with cramp-irons 78, the free ends of which are bent over.

Figure 12:
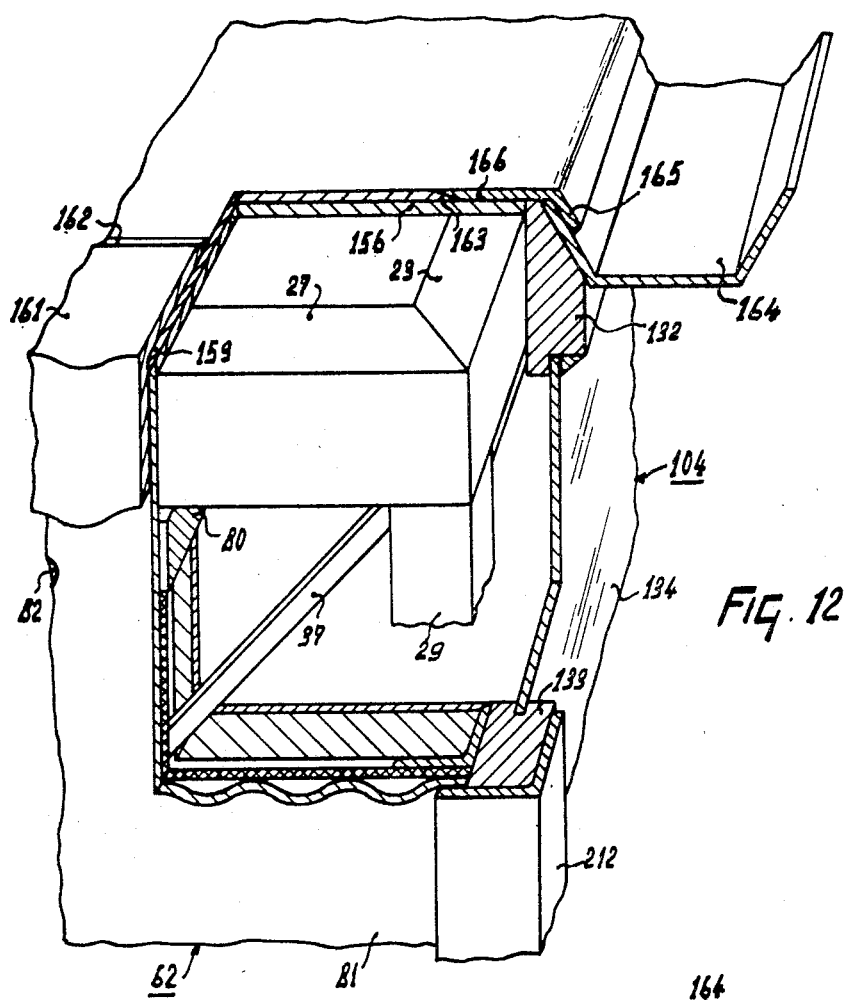
FIGURE 12 shows on an enlarged scale the top corner of the house indicated in FIG. 4 by the arrow XII, at which corner parts of the façades and the roof are shown.

As a further alternative, a wooden beam may be secured to the top element, to which beam the wall and the outer covering plate are secured. For example, the element 18, as is shown in FIGS. 10 and 12, is provided on the lower half with a wooden beam 79, which is secured to the metal frame beam 25 and on the top side with a wooden beam 80, which is arranged on the bottom side of the metal frame beam 27. The top side of the covering plate 81 of the element is secured to the beam 80 with the aid of a screw bolt 82 or other suitable means.

The layers of insulating material of two adjacent elements (FIG. 6) are intimately joined to each other. The covering plate 84 and the covering plate 71 of the two adjacent elements 15 and 16 are also joined to each other (FIG. 6). In order to prevent water from penetrating between the covering plates 71 and 84, it is advantageous, to provide on the joined edges of the plates 71 and 84, a covering strip 85. The joined frame beams 48 and 86 of the elements 15 and 16 are linked to each other by one or more bolts 87, which are accommodated in bolt holes in the flanges of the beams 48 and 86. In order to accommodate the bolts 87, when the elements are fastened to each other, provision is made in the walls 64 and 88 of the elements 15 and 16 of spaces 89 and 90, which can be closed by plates 91 and 92. These plates are finished on the outer side so that they match the layers on the walls 64 and 88.

For obtaining a seal between two covering plates of elements lying one above the other, for example the covering plates 71 and 81 of the elements 15 and 18 (FIGS. 10 and 11), the lower side of the covering plate 81 is provided on the front side with an extension 93, which has approximately half the thickness of the plate 81, whereas the top side of the plate 71 is provided on the rear side with an extension 94, which has half the thickness of the plate 71. The extensions 93 and 94 may then be arranged in the manner illustrated in FIG. 11.

The facade walls 100 and 101 (FIGS. 2 and 3) of the house are formed by facade elements which are prefabricated independently of the elements 15 to 20. These facade elements are secured to the other elements during the assembly of the building at the building site. In this embodiment the front facade 101 is built up from three prefabricated elements 102, 103 and 104 (FIGS. 8, 10 and 12). FIGURE 8 shows the lower part of the element 102 and the fastening thereof to the lower side of the element 15, while FIG. 10 shows the fastening of the facade element 103 to the top side of the element 15, and FIG. 12 shows the fastening of the facade element 104 to the top side of the element 18.

The facade elements 102, 103 and 104 are arranged one above the other and extend throughout the length of the elements 15 and 18. These facade elements 102, 103 and 104 are preferably made so that doors and windows to be arranged in the facade are incorporated as a whole in the element. In the element 102, for example, provision is made for the door 105 (FIG. 1), the window 106 and a small window 107. The element 104 is provided with the windows 108, 109 and 110 of the top floor.

The facade elements consist mainly of a frame, to which plates are secured at a given distance from each other. The facade element 102 (FIGS. 8 and 10) comprises two plates 111 and 112, which are secured at the lower end to a beam 113 and at the top end to a beam 114. The plate 111, which constitutes the outer side of the front facade, is waterproof and weather-resistant. The inner plate 112 consists preferably of a material which is suitable for an inner wall and does not require further finishing processes. The space between the two plates 111 and 112 may be left open. However, this space may also be filled out wholly or partly (see FIG. 9) with a material 115, which has insulating properties. As an alternative, the plate 112 may be made from insulating material or a plate of insulating material may be applied to the side of the plate 112 facing the plate 111.

The connection of the windows, for example, of the window 106 to the plates 111 and 112 of the facade wall may be carried out in different ways. FIGURE 9 shows one embodiment of part of the connection of the window 106 with the wall consisting of the plates 111 and 112. The window 106 comprises a wooden window beam 116, in which the pane 117 is arranged. The window beam 116 is linked to a beam 118 of the front facade 102 and between the frame 118 and the window beam 116 provision is made of a drain strip 119. The strip 119 constitutes a water arrester below the window 106.

The topmost beam 114 of the front facade element 102 is provided with a recess 120, in which an extension 121 of the lower beam 122 of the element 103 fits (FIG. 10). The front facade element 103 comprises two plates 123 and 124, which, like the facade element 102, are arranged on a framework of wooden beams. On the top side the facade element 103 is provided with a wooden beam 125 and between the beams 122 and 125 this element is provided with a wooden beam 126, which is located at the same level as the frame beam 43 of the element 15. Between the beams 125 and 126 is arranged a truss structure comprising a zigzag-shaped framework of bars 127, which constitutes a reinforcement. The zigzag-shaped arrangement of the bars 127 is similar to the zigzag-shaped bars in the inner wall shown in detail in FIG. 14, which will be described more fully hereinafter. The bars 127 are provided with pins 127A (FIG. 10), by means of which the bars are conected with the beams 125 and 126, respectively. The plates 123 and 124 are constructed in the same manner as the plates 111 and 112 of the facade element 102 and between the plates 123 and 124 insulating material may be arranged at will.

In order to prevent water from penetrating between the two facade elements 102 and 103, the lower side of the facade element 103 is provided with a strip 128, which is arranged with its top side 129 on the rear side of the plate 124 in the beam 122 and with its lower side 130 it projects over the outer side of the plate 111.

The topmost facade element 104 comprises also a frame of wooden beams. FIGURES 10 and 12 show the lowermost and the topmost beams 131 and 132, respectively, and FIG. 12 shows furthermore a side beam 133. Between these beams 131, 132 and 133 is arranged the pane 134 of the window 108. Similarly the windows 109 and 110 are arranged in the element 104. The windows 108, 109 and 110 may, if desired, be arranged at a given distance from each other, while the facade portions between the windows then consist of two plates arranged at a distance from each other, as is shown for the facade elements 102 and 103. Also between the beams 131 and 125 a strip 137 is arranged in order to prevent water from penetrating between the elements 103 and 104.

The fastening of the facade elements 102, 103 and 104 is carried out with the aid of bolts, which are fastened in the frame beams of the elements 15 and 18. FIGURE 8 shows a bolt 138, by means of which the facade element 102 is secured to the lowermost beam 41 of the element 15, while FIG. 10 shows a bolt 139, by means of which the facade element 103 is secured to the topmost beam 43 of the element 15. The facade elements 102, 103 and 104 may be secured by means of similar bolts to the vertical frame beams such as the beams 47 and 50 of the element 15. For this fastening operation recesses are provided in the side facades of the inner walls of the building, for example in the same way as the recesses 89 and 90 shown in FIG. 6. In order to secure the bolts 139 to the beam 43, the top horizontal side or ceiling 140, secured to the lower side of the beams 43 and 46, is provided with a hole 141 so that the nut 142 can be screwed onto the bolt 139. The hole 141 is provided on the top side of the ceiling 140 with a stiffening rim 143, on which is arranged the closing plate 144, which is preferably made of the same material as the ceiling 140, so that the hole 141 is closed after the bolt 139 has been mounted. The ceiling 140 and the closing plate 144 are made from suitable material, for example fiber board, and the plates of fiber board are secured to the beams 59. The hole 141 provided in the ceiling 140 may at the same time be used for accommodating the bolts 145, by which the topmost beam of the element 15 and the lowermost beam of the element 18 are secured to each other. For arranging the bolts 145, the floor part 146 of the element 18, consisting of adjacent boards 147, is also provided with a hole 148. The floor 146 around the hole 148 is provided with a stiffening rim 149, on which bears the closing plate 150. In certain cases it is sufficient to provide either the hole 141 in the ceiling 140 or the hole 148 in the floor 146 in which case both the bolt 139 and the bolt 145 can be secured through the same hole.

FIGURE 8 shows part of the floor of the ground floor arranged in the element 15. This floor comprises the boards 54, shown in FIG. 5. In order to arrange the bolts 138, the floor part of the element 15 is provided with a hole corresponding with the hole 148. This hole is not shown in FIG. 8 for the sake of clarity. FIGURE 8 shows how the ends 55 of the boards 54 are secured to the beam 41. To this end the ends of the boards 54 are provided on their bottom side with a clamping beam 151 extending along the beam 41. This clamping beam is provided with a recess 152, in which the flange 153 of the beam 41 is accommodated. The beam 151 is secured to the ends 55 of the boards 54 by means of screws 154 and the flange 153 is located between the ends 55 and the part 155 of the beam 151. Since the floors are provided in the elements during the prefabrication process, the arrangement of the clamping beam 151 and the fastening of the boards to the frame beams of the elements can be readily carried out. Also the ceilings for the various rooms of the building, for example the ceiling part 140 shown in FIG. 10, are arranged in the elements during the prefabrication process.

The roof is arranged on the top sides of the topmost elements 18, 19 and 20 and the topmost longitudinal girders 23, 24 of the element 18 and the corresponding longitudinal girders of the elements 19 and 20 support the roof. The roof, like the floor of a story, consists of adjacent boards 156, which extend near the outer edges of the roof up to the outer edges of the topmost beams of the elements, which is illustrated in FIG. 12 with the beams 23 and 27. On the adjacent beams of adjacent elements, for example on the beam 24, the boards 156 do not extend up to the outer edge, so that between the boards 156 and 157 of two adjacent elements an opening 158 is left (FIG. 14).

The roof parts are covered each by a layer 159 of waterproof material, for example, roofing felt. The layer 159 is provided near the edges of the element adjacent a further element with a downwardly bent-over rim 160. Near the side facade of the building the layer 159 extends down to the edge of the roof (see FIG. 12). On the edges of the side facades the roof is reinforced by an angular strip 161 (FIG. 12), one side of which engages the roof and the other side of which engages the side wall, so that penetration of water between the roof and the side wall is avoided. The seal between the angular reinforcement 161 and the covering material 59 is obtained by means of a strip of waterproof material 162, which engages the edge of the angular reinforcement 161. The angular reinforcement 161 is arranged on the element during the prefabrication process.

Near the front facade the covering layer 159 is provided with a bevelled edge 163 (FIG. 12). Along the front facade is arranged a gutter 164, which is secured with the aid of screws (not shown) to the top beam 132 of the element 104. The seal between the gutter, the front facade element 104 and the roof is obtained by means of a strip 165 of waterproof material arranged on these edges, this strip being provided with a bevelled edge 166 on the roof, which edge engages the bevelled edge 163. By means of adhesive the edges 163 and 166 are stuck to each other. By providing the angular reinforcement 161 along the side facade edges, an elevation is formed on the roof which prevents water from running from the roof along the side facades. The water is thus conveyed from the roof to the gutters 164 and to the sewerage via the pipes 167 (FIG. 1).

For a waterproof seal of the adjacent roof portions of two contacting elements, an adhesive filling material 168 is used (FIG. 14), which is provided in the space 158 between the rims 160 of the layers 159 projecting beyond the edges of the boards 156 and 157. On this filling material is stuck a strip 169 of waterproof material.

Figure 13:
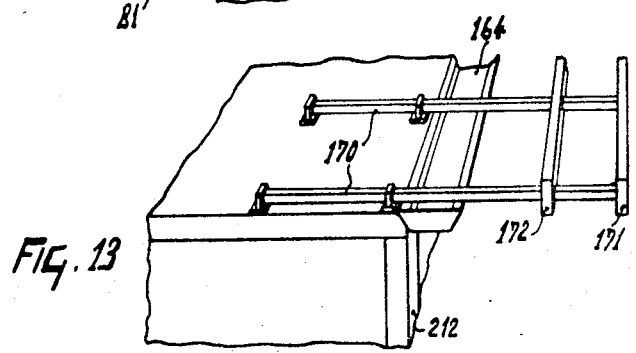
FIGURE 13 shows part of the eaves on the front of the house, which eaves are shaped in a form differing from that shown in FIG. 12.

For ornamentation or sun shading purposes, or both, a grating may be provided, as is shown in FIG. 13, on the top side of the building along the front façade. This grating comprises laths 170, secured to the roof and projecting beyond the roof and connected with each other by laths 171 and 172, extending parallel to the façade.

The seal of the roof portions arranged on two adjacent elements may also be obtained as is shown in FIG. 15. The adjacent frame beams 173 and 174 of two adjacent elements are provided with embossed parts 175 and 176, so that between the two adjacent beams 173 and 174 a space 177 is left, in which the downwardly bent-over rims 178 and 179 of the covering layers 180 and 181 on the boards of the roof can be clamped tight and held under compression. The boards 182 and 183 are provided with bevelled edges near the contacting edges of the elements, so that a V-shaped space 184 is formed, in which filling material 185 is provided in order to obtain a satisfactory seal.

Figure 17:
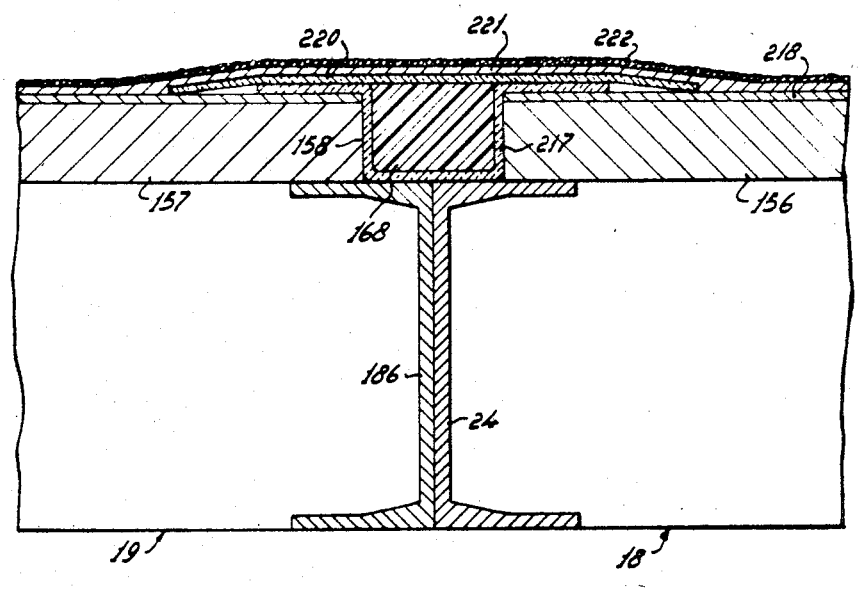
FIGURE 17 is a sectional view showing an alternate structure for sealing the roof at the conjunction of adjacent elements.

An alternative structure to obtain a water-tight seal over two adjacent connected elements 18 and 19 is shown in FIG. 17. A channel 158 is formed between horizontal boards 156 and 157 which may be composed of a sort of thatch and are secured to channel beams 24 and 186; such structure being similar to that of FIG. 14. However, a mat or strip 217 of glass fiber tissue or similar material is provided within the channel 158 and around the ends of boards 156, 157 so that strip 217, in effect, constitutes a lining for the channel 158. An adhesive filling material of flexible bituminous consistency 168 is placed within the lined channel 158 to give a waterproof seal. Due to the matted nature of strip 217, the filling material 168 tends to impregnate the strip 217 and restrict any moisture seepage which might otherwise exist. However, the strip has a certain pliancy which tends to prevent distortion of the filling material 168 that might otherwise exist due to changes in dimensions of the filling material or channel 158 caused by temperature changes or other causes. A waterproofing felt 218 directly covers the horizontal boards and is secured thereto by suitable means such as an adhesive. A strip of glass fiber tissue or similar material 220 covers the filling material 168 and strip 217. A coating material 221 is disposed over the strip 217 and felt 218 with gravel or an appropriate particulate material such as gravel 222 over the coating material 221. The substance 221 is of adhesive, flexible material which in cold condition can be applied to the roof by brooms or the like. It can, however, be asphalt, pitch, or the like.

The beam 24 of the element 18 and the beam 186 of the element 19 (FIG. 14, 16) are connected with each other by bolts 187, to which end bolt holes are provided, for example, as the holes 188 and 189 in the beams 173 and 174. In order to arrange these bolts 187 in the beams 24 and 186, the ceiling parts near the holes for the bolts 187 have openings 190 and 190A (see FIG. 14). These openings 190 and 190A are closed by fitting plates. In order to facilitate the arrangement of the bolts 187 in the holes of the beams of the elements, these bolts are provided with tapering ends 191 (FIG. 15). In order to insure a correct alignment of the holes 188 and 189, auxiliary holes 192 and 193 are provided near the bolt holes for the bolts 187 (FIG. 16), for accommodating tapering pins in order to permit a relative displacement of the engaging beams, so that the bolt holes can be aligned.

During the prefabrication of the elements, the inner walls, which constitute the partitions between the rooms of the building, are provided. FIGURE 6 shows part of such an inner wall 200, which constitutes the partition between the staircase 6 and the cupboard 7. This partition 200 is provided on either side with a layer 201 and 202, respectively, so that after the assembly of the elements the inner walls need no longer be finished further.

FIGURE 14 shows part of an inner wall 203, which constitutes the partition between the bathroom 13 and the bedroom 9. This partition 203 is arranged in the element 19 during the prefabrication process and consists of an internal core of light masonry or light cast material 204 which may be a brick material, foam concrete or the like. The core 204 is provided on either side with a layer 205 and a layer 206, respectively. The wall 203 is secured to the lower beam of the element 19 by means of cramp-irons, for example, in the same way as the wall 60 is secured to the wooden girder 75 (see FIG. 8). Between the vertical beams of the element 19, at a distance from the topmost beam 186, a smaller beam 207 formed by a metal U-profile is provided, to which beam, extending throughout the length of the element 19, is secured to the wall 203. Between the beams 207 and 186, a truss structure comprising zigzag-arranged bars 208 are provided for reinforcement. The bars 208 are welded to the beams 186 and 207. If the zigzag-arrangement of bars are secured to the wooden beams, for example the bars 127 (FIG. 10), the bars may be welded to each other, and at the point formed by two welded bars a pin 127A is welded. With a truss structure of this nature, the composite structure, beam 186, bars 208 and beam 207, is a major supporting beam and provides support for beams such as beam 21 via intermediate beams such as beam 21A. Between the beams 186 and 207, the inner wall 203 is formed by two plates 209 and 210, arranged at a distance from each other. The outer faces of these plates are coplanar to the outer sides of the beam 207. For fastening the plates 209 and 210 to the beam 207 and the beam 186, these beams are provided with wooden blocks 211, of which only one is shown. Thus a light structure of the inner wall is obtained, which may, in certain cases, even be cheaper than the structure of an inner wall of an internal core 204 with layers 205 and 206. The plates 209 and 210 are provided on the outer side with the desired ornamental layer, as well as the wall 203, for example, wallpaper or wall paint.

Owing to the construction of the elements by means of frame beams, very rigid elements are obtained, whereas the walls of the façades of the building may be made from light materials, since these materials need not contribute to the structural strength of the elements. The supporting structure of the building is formed by the frame beams of the elements. The corners between the side façades and the front façade may be further reinforced, subsequent to the assembly of the elements, by means of angular reinforcements 212, as is shown in FIG. 12.

Owing to the construction of the elements from metal, to the highly resistant beams and to the provision of light walls on them, the weight of each element as a whole and hence also that of the whole building, will be light. A building of the kind shown in this embodiment, and comprising one or more elements, will, as a rule, not require a strong foundation. In many cases it will be possible to dispose the interconnected elements on the levelled ground without the need for further means or, if desired on a floor of, for example, foundation beams comprising tiles 213, which may have an elevated central portion (FIG. 8). Such construction of a building has the further advantage that in the event of partial sagging, the tear resistance of the building is considerable. Tile 213 may be disposed under a shorter beam, such as beam 45, or under a longer beam, such as beam 41, as shown in FIG. 8.

The height of the elements may be adapted to the purpose of the building. The elements 15, 16 and 17 of the ground floor have a height 213A and the elements 18, 19 and 20 of the top floor have a height 214 (FIG. 4). The heights 213A and 214 of the elements are preferably greater than two meters and smaller than three and one-half meters. Although in this embodiment the elements arranged one above the other have the same height, the topmost elements 18 to 20 may have a smaller height than the elements 15 to 17, or conversely. If the elements are used for the erection of a dwelling, as is the case in the embodiment described above, the height of an element will preferably be about two and one-half meters. The elements for the ground floor, which serves as the dwelling space of the house, may, if desired, have a greater height than the elements of the top floor, in which the bedrooms are arranged. The elements 15 to 20 have a width 215, which is the same for all elements. However, the elements may have different widths. The widths of the elements may differ in accordance with the size of the building, but they will generally be greater than one meter and smaller than three meters. The elements will preferably have a width of two and one-half meters. The length 216 of the elements, like the other dimensions of the elements, may vary with the purpose of the building. If the elements are used for a dwelling, the length 216 will preferably be greater than three meters and smaller than ten meters. For dwellings and smaller offices and the like, the length of an element will generally be about six and one-half meters.

Since the elements are to be transported from the factory works to the building site, the dimensions of the elements are such that transportation can be readily accomplished. The dimensions of the elements preferably come up to the legal prescriptions for road transport with respect to width, length and height of work pieces.

For the electric and sanitary outfits of the house the required ducts can be arranged in the elements during the prefabrication process, so that during the assembly of the elements water, gas and light will be soon available. Since the elements are completely finished during the prefabrication process, with even doors and windows provided in the façades and inner walls and all layers applied to the walls during the prefabrication, the assembly is rapid.

The mounting of doors in the building between two adjacent rooms or the mounting of the outer doors can be carried out by fastening them to the metal beams. The beam 207 (FIG. 14), which is located at a given distance from the beam 186 may be arranged so that it coincides with the top side of a door frame, so that the door frame can be secured to such a beam. The lower side of the door frame can be secured to the lowermost beam of the element.

Although in this embodiment an element formed in the shape of a parallelepiped is provided during the prefabrication process with the side façades of the house, the floor, the roof, the ceiling and the inner walls, one or more of these walls, which constitute boundary surfaces of the rooms, may be constructed like the front façade consisting of the parts 102, 103 and 104. However, as a further alternative, all wall parts, also the front façade and the rear façade, may be secured to the element during the prefabrication process. By arranging the walls as far as possible on the frame beams of the elements during the prefabrication process, the elements can be assembled at the building site within a minimum space of time. Due to the disclosed construction, the elements are not oversensitive to shocks and bumps during transport owing to their rigid frames.

Although in this embodiment each element consisting of metal frame beams with intermediate walls is shaped in the form of a parallelepiped, flat elements may be used, which comprise a frame of beams to which the walls are wholly or partly secured during the prefabrication process.

It will be obvious that the inner walls and the outer walls, as well as the ceiling, the floor and the roof, may be constructed in a manner differing from that of the embodiment shown. These walls are, however, preferably of a light weight in order to reduce the weight of the elements. This is advantageous, inter alia, for transport purposes. The frame beams of the elements may be made from other material than metal. The frame beams of an element may even be made from different materials. The frame beams of an element, which are welded to each other in this embodiment, may be secured to each other wholly or partly by means of bolts. The angular reinforcements at the edge of the roof and the side façades are adapted to avoid damage of the elements during transport. Such stiffening edges may be provided on further walls of the element in order to avoid damage. These angular reinforcements may, if desired, be removed at the place of destination.

As used in the claims, the term "channel beams" is intended to include U-shaped beams such as beams 45 and 46, angle beams, such as 21A and 22A, and angular profiles or T-profiles such as beams 50 and 51.

Having thus described my invention, what I claim as new and desire to secure by Letters Patent of the United States is:

1. A building made of at least two adjacent prefabricated box-shaped elements, said elements provided with a framework of beams, a higher beam of each of said elements supporting a roof, said higher beams having flat top sides and being disposed in a back-to-back relationship with their top sides substantially coplanar, said roof including board means supported by said higher beams, a channel formed between the edges of said board means and a portion of said top sides of said higher beams where they are in the back-to-back relationship, said channel lined with a fibrous material, an adhesive filling material filling said channel and impregnating said fibrous material, and waterproof material applied over said filling mterial and said roof whereby said roof is watertight.

2. A building in accordance with claim 1, wherein further fibrous material is provided over said filling material.

3. A building in accordance with claim 1, wherein there is a further layer of waterproof material between said board means and said first-mentioned waterproof material.

4. A building made of at least two adjacent prefabricated box-shaped elements, said elements provided with a framework of beams, a higher beam of each of said elements supporting a roof, said higher beams having top sides and being disposed in an adjacent relationship, said roof including board means supported by said higher beams, a channel formed between the edges of said board means and a portion of said top sides of said higher beams where they are in the adjacent relationship, said channel lined with a strip of material, an adhesive filling material filling said channel, and waterproof material applied over said filling material and said roof whereby said roof is watertight.

5. A building which comprises: A plurality of prefabricated box-shaped elements, each of said elements contributing to the commutual space of the building; each of said elements provided with vertical and horizontal sides and a framework of vertical and horizontal metal beams in the form of an elongated parallelepiped; a wall in a shorter side of said element engaging said metal beams; further vertical beams intermediate the ends of said element in the longer sides thereof, said further vertical beams structurally connecting said upper and lower horizontal metal beams; and a wall portion engaging and supported by said upper and lower horizontal beams, and two of said vertical beams; said metal beams engaging said wall adjoining the whole thickness of said wall at the sides thereof, a layer of insulating material over said wall, said layer directed to the outside of the building and extending over said metal beams, a covering layer provided over said layer of insulating material.

6. A building in accordance with claim 5, wherein said beams engaging the whole thickness of said wall at the sides thereof include channel beams, said wall firmly received in the channels of said channel beams.

7. A building in accordance with claim 6, wherein said wall is composed of masonry.

8. A building in accordance with claim 6, wherein said wall is composed of concrete.

9. A building which comprises a plurality of prefabricated box-shaped elements, each of said elements contributing to the commutual space of the building, each of said elements being provided with vertical and horizontal sides and a framework of vertical and horizontal metal beams in the form of a parallelepiped, walls of concrete being secured to said metal beams of said framework, said beams including channel beams, a floor connected to the lower of said horizontal beams of said framework, a ceiling fastened to the higher of said horizontal beams of said framework, an ornamental layer provided on the inner sides of said walls and a layer of insulating material provided on the outer sides of said walls and extending over said metal beams, a covering plate secured to said element over said layer of insulating material, and fastening means through said beams connecting the frameworks of adjacent elements to one another.

10. A building having at least two stories and comprising a plurality of prefabricated box-shaped elements, each of said elements contributing to the commutual space of the building, each of said elements being provided with vertical and horizontal sides and a framework of vertical and horizontal metal beams in the form of a parallepiped, walls of concrete secured between said vertical beams of said framework, said beams including channel beams, at least one of said concrete walls being an interior wall of said building and being firmly received in the channels of said channel beams, at least one of said concrete walls being an exterior wall of said building, an ornamental layer provided on the inner side of said exterior wall, a layer of insulating material provided on the outer side of said exterior wall, a covering layer covering said insulating material at the outer side of said exterior wall, a floor connected to the lower of said horizontal beams of said framework, a ceiling connected to the higher of said horizontal beams of said framework, the horizontal beams of said framework being U-shaped in cross section, the framework of an element of a higher story resting on the framework of an element of a lower story, bolts connecting the frameworks of adjacent elements to one another, and foundation beams of inverted T configuration underlying said framework of the lower story and supporting said building.

References Cited

UNITED STATES PATENTS

| | | | |
|---|---|---|---|
| 1,362,069 | 12/1920 | Witzel | 52—745 |
| 1,421,124 | 6/1922 | Brandt | 52—127 |
| 1,924,414 | 8/1933 | Ring | 52—127 X |
| 2,704,935 | 3/1955 | Uddenborg | 52—405 X |
| 2,724,465 | 11/1955 | Krauss et al. | 52—235 X |
| 3,210,902 | 10/1965 | Craig | 52—417 |
| 3,256,652 | 6/1966 | Van Der Lely | 52—79 |

FOREIGN PATENTS

| | | |
|---|---|---|
| 1,174,629 | 11/1958 | France. |
| 1,190,816 | 4/1959 | France. |
| 1,245,658 | 10/1960 | France. |
| 823,652 | 12/1951 | Germany. |
| 318,377 | 2/1957 | Switzerland. |

ALFRED C. PERHAM, Primary Examiner

U.S. Cl. X.R.

52—236, 404, 417